United States Patent [19]

Mezger et al.

[11] Patent Number: 4,553,509

[45] Date of Patent: Nov. 19, 1985

[54] CHAIN DRIVE OF A RECIPROCATING-PISTON INTERNAL COMBUSTION ENGINE

[75] Inventors: Hans Mezger, Freiberg; Reinhard Konneker, Monsheim, both of Fed. Rep. of Germany

[73] Assignee: Harley-Davidson Motor Co., Inc., Milwaukee, Wis.

[21] Appl. No.: 630,698

[22] Filed: Jul. 13, 1984

[30] Foreign Application Priority Data

Jul. 21, 1983 [DE] Fed. Rep. of Germany ....... 3326319

[51] Int. Cl.[4] ............................................. F01L 1/04
[52] U.S. Cl. ............................ 123/90.27; 123/192 R; 474/111
[58] Field of Search .............................. 474/111, 136; 123/90.15, 90.27, 90.31, 192 R

[56] References Cited

U.S. PATENT DOCUMENTS

| 2,129,107 | 9/1938 | Taylor ................................. 474/111 |
| 3,455,178 | 7/1969 | Ruoff et al. ......................... 474/111 |
| 4,177,689 | 12/1979 | Zeilinger et al. ................... 474/111 |
| 4,472,161 | 9/1984 | Ojima ................................... 474/111 |
| 4,480,603 | 11/1984 | Tsuboi ............................... 123/90.27 |

FOREIGN PATENT DOCUMENTS

| 7003548 | 1/1970 | Fed. Rep. of Germany . |
| 7123773 | 6/1971 | Fed. Rep. of Germany . |
| 2333688 | 1/1975 | Fed. Rep. of Germany ...... 474/111 |
| 0134055 | 8/1982 | Japan .................................. 474/111 |
| 530185 | 12/1940 | United Kingdom . |

*Primary Examiner*—Craig R. Feinberg
*Assistant Examiner*—David A. Okonsky

[57] ABSTRACT

The chain drive of a reciprocating-piston internal combustion engine is tensioned on the loose strand by a double-armed, rotatably mounted tension bar cooperating with a chain tensioner. A sliding bar bears against the driving strand. A similar base member is used for the tensioning bar and the sliding bar.

8 Claims, 2 Drawing Figures

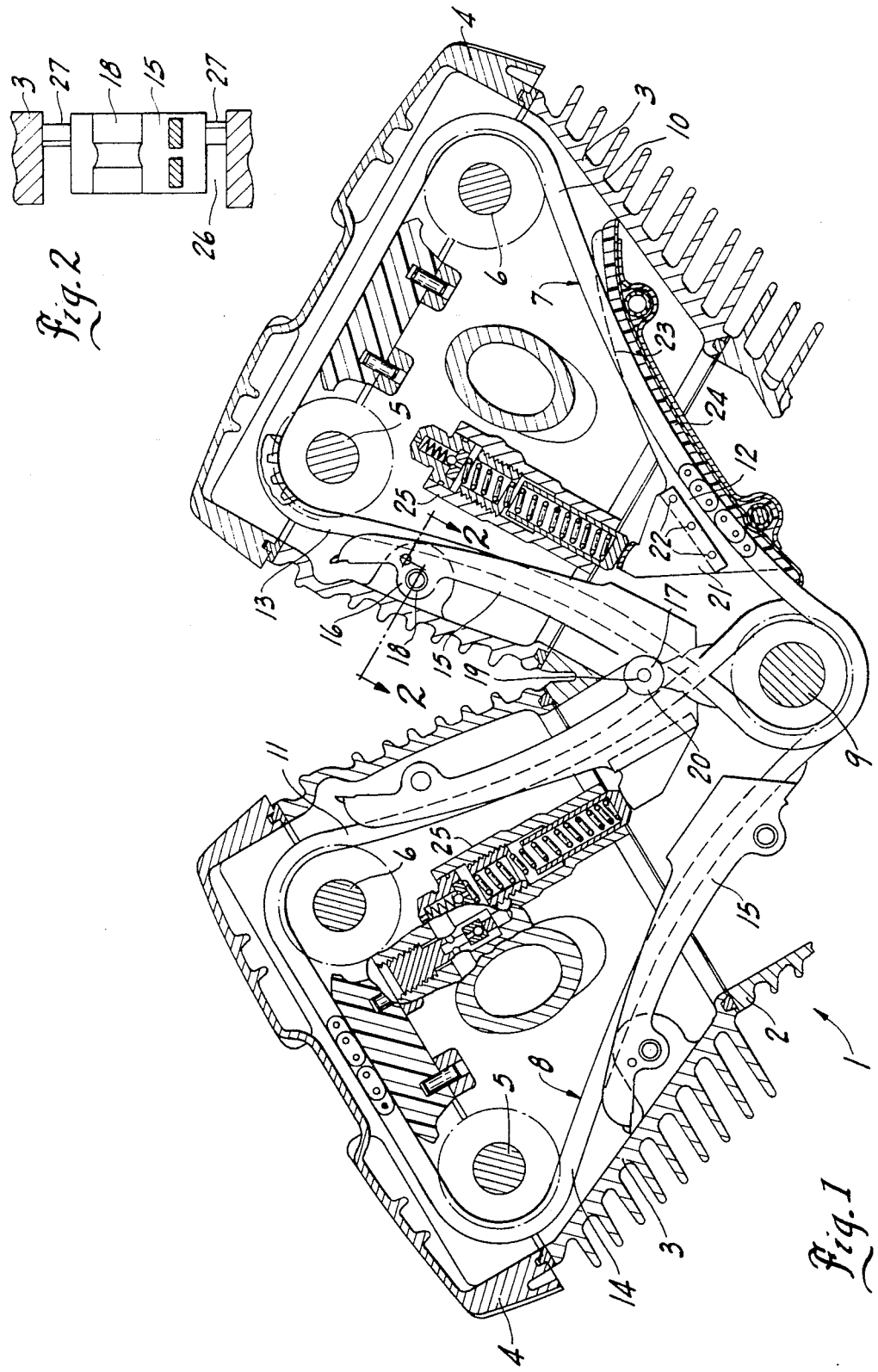

CHAIN DRIVE OF A RECIPROCATING-PISTON INTERNAL COMBUSTION ENGINE

BACKGROUND OF THE INVENTION

1. Field of the Invention

The present invention relates to the chain drive between the crankshaft and the camshafts of a reciprocating-piston internal combustion engine, and more particularly to a system for tensioning the chain thereof.

2. Description of the Prior Art

In order to keep a chain deive of the type to which this invention relates under a defined tension, and to compensate for chain extension which typically occurs after prolonged use, it is known from the German Pat. No. 24 31 425 to tension the chain by an hydraulically powered tension bar. While the basic idea is known, the prior art has not solved the major problem with such systems, i.e. preventing the tensioning bar from being pressed too hard against the chain by the hydraulic chain tensioner. A solution to this problem, especially one which is accompanied by low manufacturing costs, would represent a significant advance in the art.

OBJECTS AND SUMMARY OF THE INVENTION

It is a primary object of the present invention to provide improved guiding of the chain of a chain drive, and at the same time, provide certain resilient yielding movement of its loose strand in the transverse direction by virtue of a special design and arrangement of chain guide bars.

Another object of the present invention is to provide a chain drive system having low manufacturing costs.

How these and other objects of the invention are accomplished will be described in the following specification, taken in conjunction with the drawings. Generally, however, the objects are accomplished by providing a tensioning bar in the form of a double-armed lever. One of the lever arms is relatively long and is pressed against the chain by reason of a chain tensioner acting upon the other shorter lever arm. By such action, a power-path deflection is achieved. Transverse movements of the chain are converted into shorter paths of the hydraulic tensioning piston in accordance with the selected lever ratio. A desired resilience is achieved. The objects are further accomplished by providing a slight bend in the long tensioning arm. For compensation purposes, and as a supplement to the system just described, the load strand of the chain is guided by a sliding bar attached to the cylinder block. Such bar ensures a steady approach of the chain to the sprocket wheels on the camshaft.

To reduce manufacturing costs of the chain bars, a portion of the tensioning bars are equal to the sliding bars and both include lugs. A tensioning bar is constructed from a sliding bar by attaching a bracket thereto, the bracket forming the shorter lever arm against which the chain tensioner is allowed to act. The bracket is positioned approximately at right angles to the longitudinal direction of the tensioning bar. In the preferred embodiment of the present invention, one bolt is disposed in the V-angle of the engine and acts at the same time as a bearing bolt for the tensioning bar of one chain and a fastening bolt for the sliding bar of the other. This allows one bolt and the associated bore of the crankcase to be dispensed with. If the bearing bolt is positioned vertically above the crankcase, there is an additional advantage of a symmetrical bearing of the chain bars upon the two chains thus providing uniform tension. In order to manufacture and assemble the chain bars, no screw connections are used. In contrast with the prior art, a simple, plug-end connection with bolts and pins is employed in the present invention. This presents the additional advantage of allowing the manufacture of certain components from plastic materials.

DESCRIPTION OF THE DRAWINGS

FIG. 1 is a cross-section of a reciprocating-piston internal combustion engine; and, FIG. 2 is a view taken along the line II—II of FIG. 1.

Like reference numerals are used in the various figures to designate like components.

DESCRIPTION OF THE PREFERRED EMBODIMENT

FIG. 1 shows a housing 1 of a four-cylinder, reciprocating-piston internal combustion engine of the V-type. Housing 1 consists of a crankcase 2, two cylinder heads 3 and two cylinder head covers 4.

Two overhead camshafts 5 and 6 are provided for the exhaust and intake valves. The valves, as is known, are used in each case for controlling the gas supplied to and exhausted from the two pairs of cylinders arranged in a V-shape.

The camshafts 5 and 6 of the right-hand pair of cylinders are driven by the crankshaft 9 by way of a chain 7. The camshafts 5 and 6 of the left-hand pair of cylinders are driven by the crankshaft 9 by way of a chain 8.

According to the present invention, tensioning bars 12 bear on the loose strands 10 and 11 of the two chains 7 and 8, and sliding bars 15 bear on the driving strands 13 and 14 of the chains 7 and 8. Fastening lugs 16 and 17 are provided on the sides on each of the sliding bars 15 and bolts 18 and 19 are used to secure the sliding bars. The bolts are held in receiving members (not shown) of the housing 1.

In the illustrated embodiment, bolt 19 is positioned in the center of the V-angle vertically above the crankshaft 9 and serves two purposes. At the same time it acts as the bearing bolt for the bearing lug 20 of the left-hand tensioning bar, as well as to secure the right-hand sliding bar as previously discussed.

To reduce manufacturing and storage costs, the same basic element is used to prepare the sliding bars 15 and the tensioning bars 12. To produce a tensioning bar 12, the basic element is supplemented by a bracket 21, which is secured thereto by pins 22. The bracket 21 is positioned approximately at right angles to the longitudinal extension of the tensioning bars 12 approximately at the level of the bearing lug 20. The bearing lug forms a lever having a first longer arm and a second shorter arm (the bracket 21). The longer arm, as seen in the drawings, is a slightly curved bar 23 which is preferably provided with a damping coating 24 of rubber. The coating is also used on the sliding bars. A one piece component is formed by the fastening lug 16 and 17 together with the curved bar 23 and coating 24. The brackets 21 bear on the hydraulic chain tensioners 25 which, as seen in FIG. 1, are secured to the cylinder heads 3.

FIG. 2 illustrates the fact that the sliding bars 15 are held in recesses 26 formed on the outside of the cylinder heads 3. Rubber knobs 27, which are supported on the walls of the recesses 26, are provided on the longitudinal sides of the sliding bars 15.

The chain tensioners 25 cooperate with the sliding bars and the tensioning bars to improve the overall camshaft drive system. The sliding bars ensure a smooth travel of the drive strands of the chain as they approach the sprocket wheels of camshaft 5. On the other hand, the tensioning bars, being urged into contact of the loose strands by the chain tensioner convert transverse movements of the chain into shorter paths of the hydraulic tensioning piston so that a desired resilience is achieved. The slight bending of the long tensioning arm assists in achieving this object.

While the present invention has been described in connection with a certain preferred embodiment, the invention is not to be limited thereby, but is to be limited solely by the claims which follow.

We claim:

1. A chain drive apparatus for a reciprocating-piston internal combustion engine of the type having cylinders arranged in a V-configuration above a crankcase and which has overhead camshafts driven by a pair of chains coupled to the crankshaft, said apparatus comprising a tensioning bar for each chain, each of said tensioning bars including two arms arranged generally at right angles with respect to each other, each of said tensioning bars being pivotably mounted to said engine by a single lateral bearing lug so as to form a lever, a first arm of said tensioning bar pressing against the loose strand of its respective chain, chain tensioner means bearing against the second arm of said tensioning bar to vary the pressure of the first arm against said chain, and a sliding bar means for each chain, secured to said engine, to guide the driving strand of its respective chain.

2. The invention set forth in claim 1 wherein that portion of said sliding bar and said tensioning bar which is located toward said chains is coated with a damping coating selected from the group consisting of plastic or rubber material and wherein the fastening lugs of said sliding bar and the bearing lug of said tension bar are integral therewith.

3. The invention set forth in claim 1 wherein said sliding bars and said tensioning bars are disposed in recesses on the outside of the engine housing and are supported therein by lateral knobs.

4. The invention set forth in claim 1 wherein said first arm of said tensioning bar comprises a first member which is the same as a sliding bar and said second arm comprises a bracket secured to said first member approximately vertically to the longitudinal direction thereof, said bracket having a first end coupled to said first member and a second end contacted by said chain tensioner, one of said fastening lugs of said first member acting as a bearing lug.

5. The invention set forth in claim 4 wherein said first end of said bracket means is coupled to said first member by pin means approximately at the level of said bearing lug.

6. The invention set forth in claim 1 wherein each tensioning bar and sliding bar includes a pair of lugs, which in the case of said sliding bar are employed as fastening lugs to secure said sliding bar to said engine by the use of bolts, and in the case of the tensioning bar, one of which is used for said pivotable mounting as a bearing lug.

7. The invention set forth in claim 6 wherein the bearing lug of the tensioning bar of one chain is mounted to the bolt securing the fastening lug of the sliding bar employed with the other chain.

8. The invention set forth in claim 7 wherein said bolt used for said dual purpose is secured in said crankcase vertically above said crankshaft.

* * * * *